US009479432B2

(12) United States Patent
Hu

(10) Patent No.: US 9,479,432 B2
(45) Date of Patent: Oct. 25, 2016

(54) DHT-BASED CONTROL NETWORK IMPLEMENTATION METHOD AND SYSTEM, AND NETWORK CONTROLLER

(71) Applicant: ZTE Corporation, Shenzhen, Guangdong (CN)

(72) Inventor: Yongsheng Hu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/650,765

(22) PCT Filed: Sep. 27, 2013

(86) PCT No.: PCT/CN2013/084519
§ 371 (c)(1),
(2) Date: Jul. 17, 2015

(87) PCT Pub. No.: WO2014/090020
PCT Pub. Date: Jun. 19, 2014

(65) Prior Publication Data
US 2015/0372905 A1 Dec. 24, 2015

(30) Foreign Application Priority Data
Dec. 14, 2012 (CN) .......................... 2012 1 0543591

(51) Int. Cl.
| H04L 12/717 | (2013.01) |
| H04L 29/08 | (2006.01) |
| H04L 12/24 | (2006.01) |
| H04L 12/703 | (2013.01) |
| H04L 12/743 | (2013.01) |

(52) U.S. Cl.
CPC ............... *H04L 45/42* (2013.01); *H04L 29/08* (2013.01); *H04L 41/042* (2013.01);
(Continued)

(58) Field of Classification Search
CPC ... H04L 67/104; H04L 29/08; H04L 41/042; H04L 41/5054; H04L 45/28; H04L 45/7453; H04L 67/141
See application file for complete search history.

(56) References Cited

U.S. PATENT DOCUMENTS

2011/0238959 A1 9/2011 Shinozaki
2011/0261722 A1 10/2011 Awano
(Continued)

FOREIGN PATENT DOCUMENTS

CN 101039275 A 9/2007
CN 102200768 A 9/2011
(Continued)

OTHER PUBLICATIONS

International Search Report in international application No. PCT/CN2013/084519, mailed on Jan. 2, 2014.
(Continued)

*Primary Examiner* — David Oveissi
(74) *Attorney, Agent, or Firm* — Oppedahl Patent Law Firm LLC

(57) ABSTRACT

The disclosure discloses a Distributed Hash Table (DHT)-based control network implementation method and system. The method includes that: switches establish routing control channels with specified network controllers in a distributed Peer-to-Peer (P2P) network; head-node network controllers generate P2P path creation request messages, and forward the P2P path creation request messages along paths until the P2P path creation request messages reach end-node network controllers; each network controller on the paths transmits forwarding flow tables contained in the P2P path creation request messages to the switches managed by themselves to finish respective local path creation according to the P2P path creation request messages; and the head-node network controllers determine whether the paths are successfully created or not in combination with local path creation results according to received P2P path creation responses. The disclosure further discloses a network controller. By the disclosure, a network controller network is self-organized, and is automatically accessed by the switches, and meanwhile, calculation and transmission of the network paths are easy to manage.

19 Claims, 7 Drawing Sheets

(52) U.S. Cl.
CPC .......... *H04L 41/5054* (2013.01); *H04L 45/28* (2013.01); *H04L 45/7453* (2013.01); *H04L 67/104* (2013.01); *H04L 67/141* (2013.01)

(56) References Cited

U.S. PATENT DOCUMENTS

| | | | | |
|---|---|---|---|---|
| 2012/0191778 | A1* | 7/2012 | Kim | H04L 65/4076 709/204 |
| 2013/0198332 | A1 | 8/2013 | Van Ackere | |

FOREIGN PATENT DOCUMENTS

| | | |
|---|---|---|
| CN | 102498694 A | 6/2012 |
| CN | 102594689 A | 7/2012 |
| CN | 102714628 A | 10/2012 |
| CN | 103051539 A | 4/2013 |
| WO | 2012022751 A1 | 2/2012 |

OTHER PUBLICATIONS

English Translation of the Written Opinion of the International Search Authority in international application No. PCT/CN2013/084519, mailed on Jan. 2, 2014.
Supplementary European Search Report in European application No. 13861568.7, mailed on Nov. 27, 2015.
Change: Enabling Innovation in the Internet Architecture through Flexible Flow-Processing Extensions D4.2 Inter-platform signalling, mailed on Jan. 30, 2012.
In-packet Bloom filter based data center networking with distributed Open Flow controllers, mailed on Dec. 6, 2010.
Data center networking with in-packet Bloom filters, mailed on May 24, 2010.
Investigation and validation of the Open Flow protocol for next generation converged optical networks, mailed on Jun. 1, 2011.
SPARC ICT-258457 Split Architecture for Large Scale Wide Area Networks. Deliverable D3.3, mailed on Dec. 1, 2011.

* cited by examiner

Fig. 3
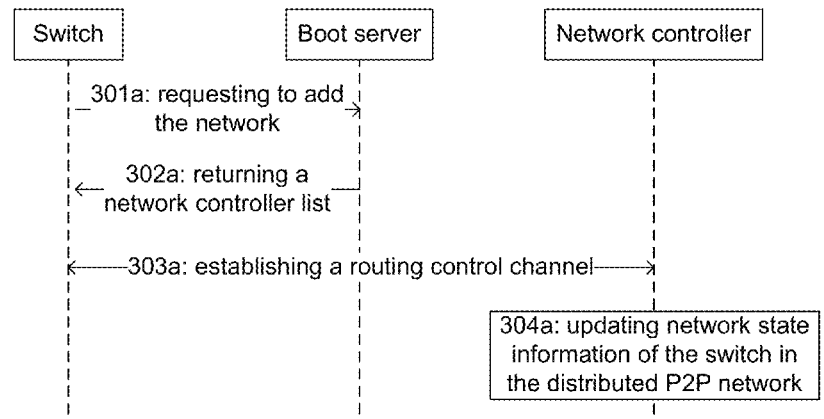
(a)
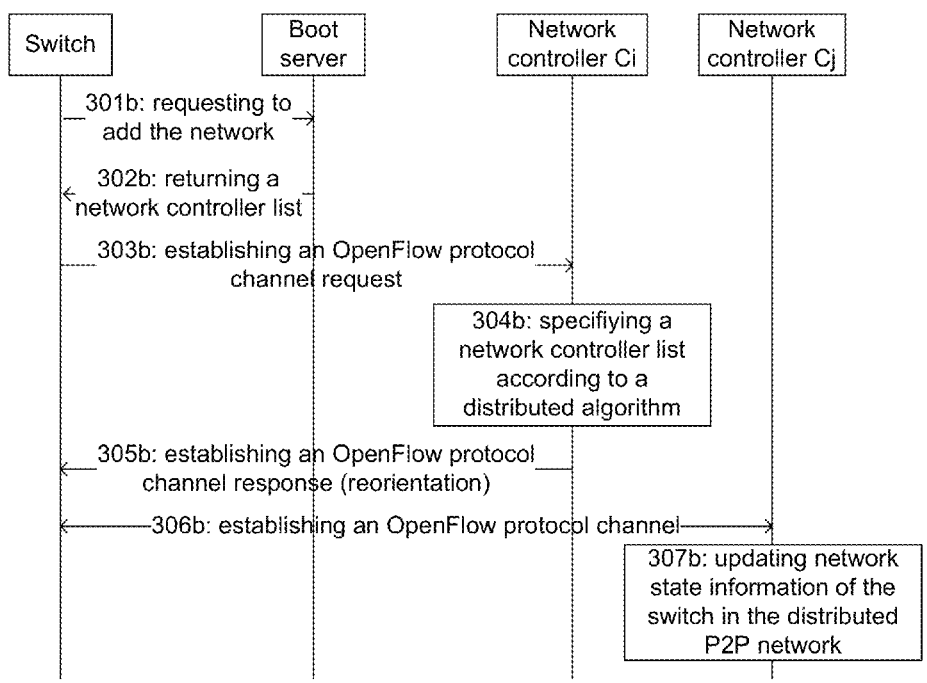
(b)

DHT-BASED CONTROL NETWORK IMPLEMENTATION METHOD AND SYSTEM, AND NETWORK CONTROLLER

TECHNICAL FIELD

The disclosure relates to the field of computer networks, and in particular to a Distributed Hash Table (DHT)-based control network implementation method and system, and a network controller.

BACKGROUND

Stanford University proposes OpenFlow protocol in 2008, the protocol adopts a forwarding/control separate architecture, and an external control plane entity adopts OpenFlow protocol to control forwarding plane equipment to implement various forwarding logics. The forwarding plane equipment mainly functions in executing controlled forwarding according to a flow table transmitted by an OpenFlow network controller, and its behaviour is standardized to: receive a message, extract an L2/L3/L4 related field value of its header, search the flow table by taking the L2/L3/L4 related field value as a keyword, translate a field of the message according to an instruction set in a table entry content after a table entry is matched and forward the message to a certain logical or physical port after translation. The protocol is further evolved into a basis for a Software Defined Network (SDN) technology, that is, various complex network applications may be implemented by adopting software programming on a control plane without any change in the forwarding plane equipment. The control plane adopts a universal server and a universal operating system, and the network applications may be implemented by virtue of a universal software programming tool as well as a script programming language such as Python (an object-oriented interpreted computer programming design language), which makes the supporting of a new network protocol become very simple and greatly shortens a development cycle of a new technology.

A basic OpenFlow network includes two major control entities, i.e. a network controller and a switch. A centralized network controller responsible for management and control over all the switches in the whole network domain is usually deployed in the network. However, a single centralized network controller may become a bottleneck of network scale-up, for example, a time delay of flow establishment with the switch farer away from the network controller is increased, switching path request processing throughput of a single network controller is limited, and an end-to-end path is poor in bandwidth controllability. Therefore, the academic circle proposes distributed network controller solutions, such as hyperflow management and Online Information Exchange (ONIX), and in these solutions, multiple network controllers for managing and controlling an SDN together are usually deployed on the network.

In the technical solution disclosed in an American patent application with the publication number of US20110261722: routing path information is placed in a header of a first data message of a flow, and a switch on a path establishes a forwarding flow table according to the routing path information in the header of the message when performing message forwarding. For such a large-scale network, multiple switches and multiple network controllers are usually involved in connection selection and maintenance and path calculation and transmission between the switches and the network controllers, which greatly increases network maintenance cost.

Thus it can be seen that flow table transmission of multiple network controllers and multiple switches is often involved in a path establishment process in an existing distributed network controller solution for an SDN, and a complex interaction process increases complexity in service maintenance, goes against state unification of a management plane and a forwarding plane and greatly increases network maintenance cost.

SUMMARY

In view of this, the embodiment of the disclosure is to provide a DHT-control network implementation method and system, so as to implement self-organization of a network controller network and automatic access of switches and simultaneously make calculation and transmission of network paths easy to manage.

In order to achieve the purpose, the technical solutions of the embodiment of the disclosure are implemented as follows.

The embodiment of the disclosure provides a DHT-based control network implementation method, including that:

switches establish routing control channels with specified network controllers in a distributed Peer-to-Peer (P2P) network;

the network controllers receiving path creation requests perform path calculation as head-node network controllers, generate P2P path creation request messages, and forward the P2P path creation request messages along paths;

the network controllers receiving the P2P path creation request messages on the paths transmit forwarding flow tables contained in the P2P path creation request messages to the switches managed by themselves to finish respective local path creation, wherein intermediate-node network controllers on the paths forward the P2P path creation request messages along the paths after finishing local path creation, and end-node network controllers return P2P path creation response messages along reverse paths after finishing local path creation;

the intermediate-node network controllers receiving the P2P path creation response messages update the P2P path creation response messages in combination with local path creation results, and forward the updated P2P path creation response messages along the reverse paths; and the head-node network controllers judge whether the paths are successfully created or not in combination with local path creation results after receiving the P2P path creation response messages.

Preferably, the step that the switches establish the routing control channels with the specified network controllers in the distributed P2P network includes that:

the switches establish the routing control channels with the network controllers in a specified network controller list directly returned by a boot server; or, the boot server boots the switches to any network controllers, and the switches are reoriented to the specified network controllers according to information returned by the any network controllers, and establish the routing control channels with the specified network controllers.

Preferably, the routing control channels are OpenFlow protocol channels, Simple Network Management Protocol (SNMP) channels or DIAMATER channels.

Preferably, sequences of the network controllers on the paths and sequences of the switches on the paths are obtained by path calculation.

Preferably, destination nodes of the P2P path creation request messages are the end-node network controllers on the paths;

routing path headers of the P2P path creation request messages consist of Identifiers (ID) of the other network controllers except the end-node network controllers on the paths; and message bodies of the P2P path creation request messages consist of the forwarding flow tables transmitted to each switch on the paths.

Preferably, the IDs of the other network controllers are arranged according to sequences of the other network controllers on the paths; and the forwarding flow tables transmitted to each switch are arranged according to the sequences of the switches on the paths.

Preferably, after the head-node network controllers generate the P2P path creation request messages, the method further includes that: the head-node network controllers transmit the forwarding flow tables contained in the P2P path creation request messages to the switches managed by themselves.

Preferably, the step that the end-node network controllers on the paths return the P2P path creation response messages along the reverse paths after finishing local path creation is implemented as follows:

if local path creation succeeds, the end-node network controllers return successful P2P path creation response messages; and if local path creation fails, the end-node network controllers return failed P2P path creation response messages.

Preferably, the step that the intermediate-node network controllers receiving the P2P path creation response messages update the P2P path creation response messages in combination with the local path creation results, and forward the updated P2P path creation response messages along the reverse paths is implemented as follows:

if local path creation succeeds and the successful P2P path creation response messages are received, the updated successful P2P path creation response messages are forwarded along the reverse paths;

if local path creation succeeds and the failed P2P path creation response messages are received, the updated failed P2P path creation response messages are forwarded along the reverse paths; and if local path creation fails and the failed or successful P2P path creation response messages are received, the updated failed P2P path creation response messages are forwarded along the reverse paths.

Preferably, the step that the head-node network controllers judge whether the paths are successfully created or not in combination with the local path creation results after receiving the P2P path creation response messages is implemented as follows:

when the head-node network controllers receive the successful P2P path creation response messages and local path creation succeeds, the head-node network controllers determine that path creation succeeds; and when the head-node network controllers receive the failed P2P path creation response messages or local path creation fails, the head-node network controllers determine that path creation fails, and perform path recalculation.

Preferably, after the network controllers on the paths receive the P2P path creation response messages, the method further includes that: if the failed P2P path creation response messages are received or local path creation fails, the network controllers perform rollback operation on the forwarding flow tables which have been locally transmitted.

The embodiment of the disclosure further provides a DHT-based control network implementation system, including: switches and network controllers, wherein the switches are configured to establish routing control channels with specified network controllers in a distributed P2P network;

the network controllers are configured to, when receiving path creation requests, perform path calculation as head-node network controllers, generate P2P path creation request messages, and forward the P2P path creation request messages along paths; when receiving the P2P path creation request messages, transmit forwarding flow tables contained in the P2P path creation request messages to the switches managed by themselves to finish local path creation; forward the P2P path creation request messages along the paths as intermediate-node network controllers on the paths after finishing local path creation; return P2P path creation response messages along reverse paths as end-node network controllers on the paths after finishing local path creation; when receiving the P2P path creation response messages, update the P2P path creation response messages in combination with local path creation results as the intermediate-node network controllers on the paths, and forward the updated P2P path creation response messages along the reverse paths; and judge whether the paths are successfully created or not in combination with local path creation results as the head-node network controllers after receiving the P2P path creation response messages.

Preferably, the system further includes a boot server, configured to return a specified network controller list to the switches; or, boot the switches to any network controllers; and correspondingly, the switches are further configured to establish the routing control channels with the network controllers in the specified network controller list directly returned by the boot server; or, be reoriented to the specified network controllers according to information returned by the any network controllers, and establish the routing control channels with the specified network controllers.

Preferably, the network controllers are further configured to, after generating the P2P path creation request messages as the head-node network controllers, transmit the forwarding flow tables contained in the P2P path creation request messages to the switches managed by themselves.

Preferably, the network controllers are further configured to, as the end-node network controllers, return successful P2P path creation response messages along the reverse paths if local path creation succeeds; and return failed P2P path creation response messages along the reverse paths if local path creation fails.

Preferably, the network controllers are further configured to, when receiving the P2P path creation response messages as the intermediate-node network controllers, forward the updated successful P2P path creation response messages along the reverse paths if local path creation succeeds and the successful P2P path creation response messages are received; forward the updated failed P2P path creation response messages along the reverse paths if local path creation succeeds and the failed P2P path creation response messages are received; and forward the updated failed P2P path creation response messages along the reverse paths if local path creation fails and the failed or successful P2P path creation response messages are received.

Preferably, the network controllers are further configured to, after receiving the P2P path creation response messages as the head-node network controllers, determine that path creation succeeds when the successful P2P path creation response messages are received and local path creation succeeds; and determine that path creation fails, and perform path recalculation when the failed P2P path creation response messages are received or local path creation fails.

Preferably, the network controllers are further configured to, after receiving the P2P path creation response messages, perform rollback operation on the forwarding flow tables which have been locally transmitted if the failed P2P path creation response messages are received or local path creation fails.

The embodiment of the disclosure further provides a network controller, including: a first routing control protocol module, a distributed processing module, a routing control and transmission module and a distributed routing protocol module, wherein the first routing control protocol module is configured to be responsible for establishment of a routing control channel between the network controller and a switch and information interaction between the network controller and the switch;

the distributed processing module is configured to generate a P2P path creation request message according to path information provided by the first routing control and transmission module, and provide the P2P path creation request message for the distributed routing protocol module to forward; generate a P2P path creation response message according to a local path creation result provided by the routing control and transmission module, and provide the P2P path creation response message for the distributed routing protocol module to forward; receive the P2P path creation request message provided by the distributed routing protocol module, and provide a forwarding flow table contained therein for the routing control and transmission module; receive the P2P path creation response message provided by the distributed routing protocol module, update the received P2P path creation response message according to the local path creation result provided by the routing control and transmission module, and provide the updated P2P path creation response message for the distributed routing protocol module to forward; and determine whether a path is successfully created or not according to the local path creation result provided by the routing control and transmission module and the P2P path creation response message provided by the distributed routing protocol module;

the routing control and transmission module is configured to perform path calculation to obtain the path information when the network controller receives the path creation request as a head-node network controller, and provide the path information for the distributed processing module; and transmit the forwarding flow table provided by the distributed processing module for the corresponding switch to finish local path creation through the first routing control protocol module, and provide the local path creation result for the distributed processing module; and the distributed routing protocol module is configured to forward or receive the P2P path creation request message along the path; forward or receive the P2P path creation response message along a reverse path; and provide the received P2P path creation request message or P2P path creation response message for the distributed processing module.

Preferably, the distributed processing module is further configured to, when path creation is determined to fail, notify the routing control and transmission module to execute rollback operation on the forwarding flow table; and the routing control and transmission module is further configured to perform rollback operation on the transmitted forwarding flow table through the first routing control protocol module.

According to the DHT-based control network implementation method and system in the embodiment of the disclosure: the switches establish the routing control channels with the specified network controllers in the distributed P2P network; the network controllers receiving the path creation requests perform path calculation as the head-node network controllers, generate the P2P path creation request messages, and forward the P2P path creation request messages along the paths; the network controllers receiving the P2P path creation request messages on the paths transmit the forwarding flow tables contained in the P2P path creation request messages to the switches managed by themselves to finish respective local path creation, wherein the intermediate-node network controllers on the paths forward the P2P path creation request messages along the paths after finishing local path creation, and the end-node network controllers return the P2P path creation response messages along the reverse paths after finishing local path creation; the intermediate-node network controllers receiving the P2P path creation response messages update the P2P path creation response messages in combination with the local path creation results, and forward the updated P2P path creation response messages along the reverse paths; the head-node network controllers judge whether the paths are successfully created or not in combination with the local path creation results after receiving the P2P path creation response messages; and therefore, calculation and transmission of the network paths are easy to manage. In addition, the switches establish the routing control channels with the specified network controllers in the distributed P2P network, so that the network controller network is self-organized, and is automatically accessed by the switches.

BRIEF DESCRIPTION OF THE DRAWINGS

FIG. 3 is a diagram of establishment of a routing control channel between a switch and a specified network controller according to an embodiment of the disclosure;

DETAILED DESCRIPTION

The technical solutions of the disclosure are further described below with reference to the drawings and specific embodiments in detail.

Figure 1:
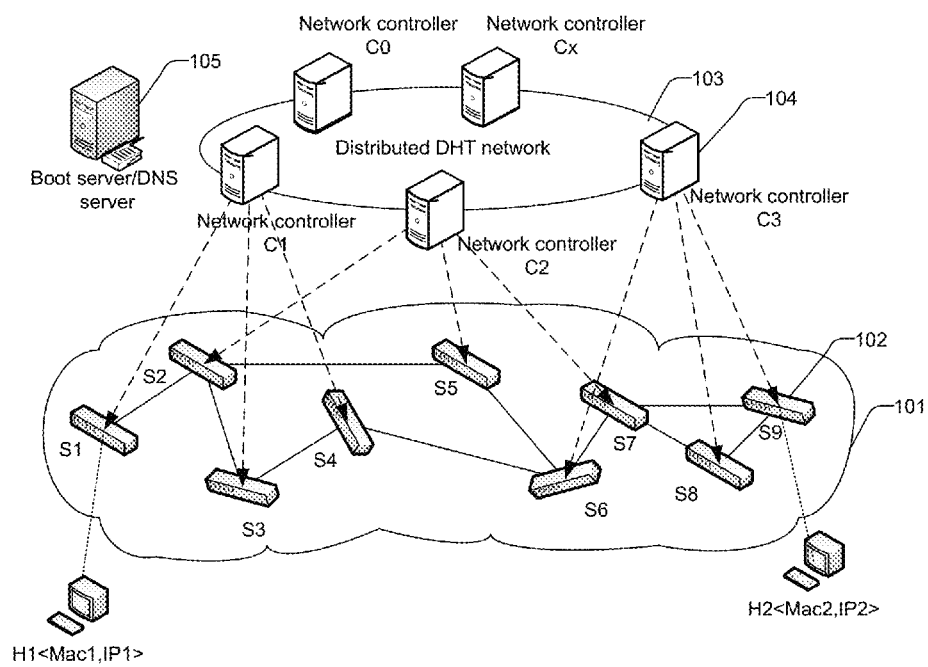
FIG. 1 is a structure diagram of a DHT-based SDN network system according to an embodiment of the disclosure.

A network architecture of a DHT-based control network implementation solution according to an embodiment of the disclosure is shown in FIG. 1. FIG. 1 is a structure diagram of a DHT-based SDN network system according to an embodiment of the disclosure, an SDN including: a switch network 101, a distributed P2P network 103 and a boot server 105, wherein the switch network 101 consists of multiple physically interconnected switches 102, the switches 102 are interconnected through physical links, and each switch 102 generates a switch ID with a fixed length by virtue of a HASH algorithm, a MID5 algorithm and the like according to information such as a Media Access Control (MAC) address and a Destination Process ID (DPID). The switches 102 establish reliable routing control channels with specified network controllers 104 for related operation such as security verification, basic information reporting and switch configuration through the boot server 105 when being powered on. The switches 102 are totally controlled by the network controllers 104, the switches 102 process received data messages according to forwarding flow tables transmitted by the network controllers 104, and the switches 102 report data messages which cannot be found in local flow tables to the network controllers 104 for processing.

The distributed P2P network 103 is a distributed DHT network, such as a one-hop DHT network and a Pastry network, consisting of at least one network controller 104. The network controllers 104 communicate with one another on the basis of a distributed routing protocol (such as a Resource Location And Discovery (RELOAD) protocol). Wherein, each network controller 104 generates a network controller ID with a fixed length by virtue of the HASH algorithm, the MID5 algorithm and the like according to information according to an Internet Protocol (IP) address. It should be pointed out that the network controller IDs and the switch IDs are character strings with the same fixed length, and for example, HASH or MID5 operation is performed on the DIPID or MAC addresses of the switches to obtain 128-bit character strings as the IDs; and HASH or MID5 operation is performed on the IP addresses of the network controllers to obtain 128-bit character strings as the IDs. Each network controller 104 is responsible for managing one or more switches 102 (that is, one or more switches 102 establish (a) routing control channel(s) with a network controller 104 respectively), and related principles for establishment of corresponding relationships between the switches and the network controllers may be determined by virtue of a distributed algorithm, for example, the switches 102 and network controllers 104 at the shortest ID distances establish routing control channels, or the corresponding switches 102 and network controllers 104 at the shortest ID distances which are greater than a preset threshold value establish routing control channels. Of course, the principles for the establishment of the corresponding relationships between the network controllers 104 and the switches 102 are not limited to the abovementioned two, and all principles determined by virtue of the distributed algorithm can be used. Each network controller 104 performs routing calculation on data messages reported by the managed switches 102, and transmit forwarding flow tables to the managed switches 102 to finish data exchange through the distributed routing protocol.

The boot server 105 is responsible for booting the switches 102 to establish the routing control channels with the specified network controllers 104. The boot server 105 may be an ordinary Domain Name Server (DNS), and is responsible for booting the switches 102 to any network controllers 104, and then the switches 102 are reoriented to the specified network controllers 104 according to information returned by the network controllers 104; and the boot server 105 may further interact with the distributed P2P network 103 to directly notify the switches 102 of the network controllers 104 determined by virtue of the distributed algorithm, and then the switches 102 directly establish the routing control channels with the network controllers 104.

Figure 2:
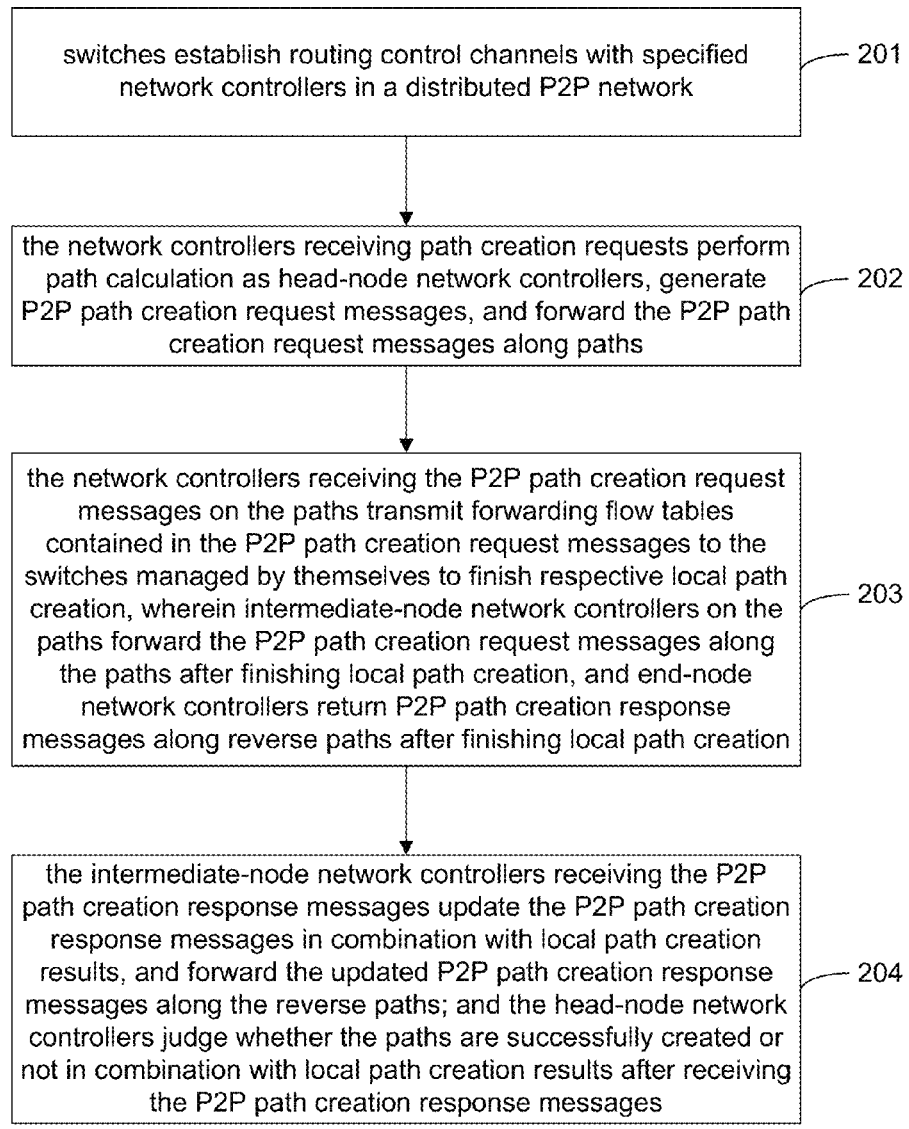
FIG. 2 is a DHT-based control network implementation method according to an embodiment of the disclosure.

A DHT-based control network implementation method provided by the embodiment of the disclosure, as shown in FIG. 2, includes the following steps:

Step 201: switches establish routing control channels with specified network controllers in a distributed P2P network.

Step 202: the network controllers receiving path creation requests perform path calculation as head-node network controllers, generate P2P path creation request messages, and forward the P2P path creation request messages along paths.

Step 203: the network controllers receiving the P2P path creation request messages on the paths transmit forwarding flow tables contained in the P2P path creation request messages to the switches managed by themselves to finish respective local path creation, wherein intermediate-node network controllers on the paths forward the P2P path creation request messages along the paths after finishing local path creation, and end-node network controllers return P2P path creation response messages along reverse paths after finishing local path creation.

Step 204: the intermediate-node network controllers receiving the P2P path creation response messages update the P2P path creation response messages in combination with local path creation results, and forward the updated P2P path creation response messages along the reverse paths; and the head-node network controllers determine whether the paths are successfully created or not in combination with local path creation results after receiving the P2P path creation response messages.

The solution of the disclosure is described below with reference to the drawings and specific embodiments in detail.

Implementation manners for Step 201 include: the switches establish the routing control channels with the network controllers in a specified network controller list directly returned by a boot server; or, the boot server boots the switches to any network controllers, and the switches are reoriented to the specified network controllers according to information returned by the any network controllers, and establish the routing control channels with the specified network controllers.

FIG. 3 is a diagram of establishment of a routing control channel between a switch and a specified network controller according to an embodiment of the disclosure. Wherein, FIG. 3(a) describes a flow of establishment of the routing control channels between the switches and the network controllers in the network controller list directly returned by the boot server in a network addition process of the switches; and FIG. 3(b) describes a flow of booting the switches to any network controllers by the boot server executing a function of an ordinary DNS, reorienting the switches to the specified network controllers according to the information returned by the any network controllers and establishing the routing control channels with the specified network controllers.

Preferably, the routing control channels in the embodiment of the disclosure may be OpenFlow protocol channels, SNMP channels or DIAMATER channels.

As shown in FIG. 3(a), specific steps of adding a switch to the network are described as follows:

Step 301a: the switch requests the boot server to establish a connection with the network controller.

Step 302a: the boot server selects the network controller responsible for managing the switch according to a distributed algorithm, and returns information of the network controller to the switch.

Here, the boot server may further select one or more backup network controllers responsible for managing the switch according to the distributed algorithm, and return information of the backup network controllers to the switch.

Preferably, the information of the network controller may be sent to the switch in form of list.

In the step, the selection of the network controller responsible for managing the switch refers to: selecting the network controller capable of establishing a corresponding relationship with the current switch according to an establishment principle for the corresponding relationship between the network controller and the switch, as mentioned above.

Step 303a: the switch establishes (a) routing control channel(s) with one or more network controllers in the network controller list according to the network controller list returned by the boot server.

When the boot server returns the network controller list, the network controller which is determined to be the most proper according to the distributed algorithm may usually be arranged in the first place, and the other backup network controllers are sequentially arranged backwards. Preferably, the switch may preferably establish a routing control channel with the network controller which is arranged at the top according to the arrangement sequence. If the switch cannot establish a routing control channel with the first network controller, the switch tries to establish a routing control channel with the second network controller, and so on.

Preferably, the switch may further establish routing control channels with multiple network controllers in the list according to the distributed algorithm, and how to specifically select the network controllers from the list is determined by virtue of the distributed algorithm.

Step 304a: the network controller establishes the routing control channel with the switch, and updates information of the switch and a network neighbour topology relationship of the switch in the distributed P2P network.

As shown in FIG. 3(b), specific steps of adding a switch to the network are described as follows:

Step 301b: the switch requests the boot server to establish a connection with the network controller.

Step 302b: the boot server executes a DNS reorientation function, and returns a network controller list 1 to the switch.

Step 303b: the switch randomly selects a network controller Ci from the network controller list 1, and sends an OpenFlow protocol channel establishment request.

Step 304b: the network controller Ci selects one or more network controllers responsible for managing the switch according to a distributed algorithm, and generates a network controller list 2. (The implementation of selection of the network controllers in the step is the same as that in Step 202a).

Step 305b: the network controller Ci returns a reorientation response to the switch to indicate the switch to establish OpenFlow protocol channels with the network controllers in the network controller list 2.

Step 306b: the switch establishes (an) OpenFlow protocol channel(s) with one or more network controllers in the network controller list 2 according to the reorientation response. In the embodiment, it is supposed that the switch establishes an OpenFlow protocol channel with a network controller Cj in the network controller list 2.

Step 307b: the network controller Cj establishes the OpenFlow protocol channel with the switch, and updates information of the switch and a network neighbour topology relationship of the switch in the distributed P2P network.

Implementation manners for Step 202 include: path information obtained by path calculation is as follows: a sequence of the network controllers on the paths and a sequence of the switches on the paths. The network controllers (the head-node network controllers) performing path calculation generate the P2P path creation request messages, and destination nodes of the messages are the last network controllers, i.e. the end-node network controllers, on the paths; routing path headers of the messages consist of IDs of the other network controllers except the end-node network controllers on the paths, and preferably, the IDs of the other network controllers are arranged according to sequences of the other network controllers on the paths; and message bodies of the messages consist of the forwarding flow tables transmitted to each switch on the paths, and preferably, the forwarding flow tables transmitted to each switch are arranged according to the sequences of the switches on the paths. During forwarding, the P2P path creation request messages are forwarded to the next network controllers according to the routing path headers of the P2P path creation request messages.

Figure 4:
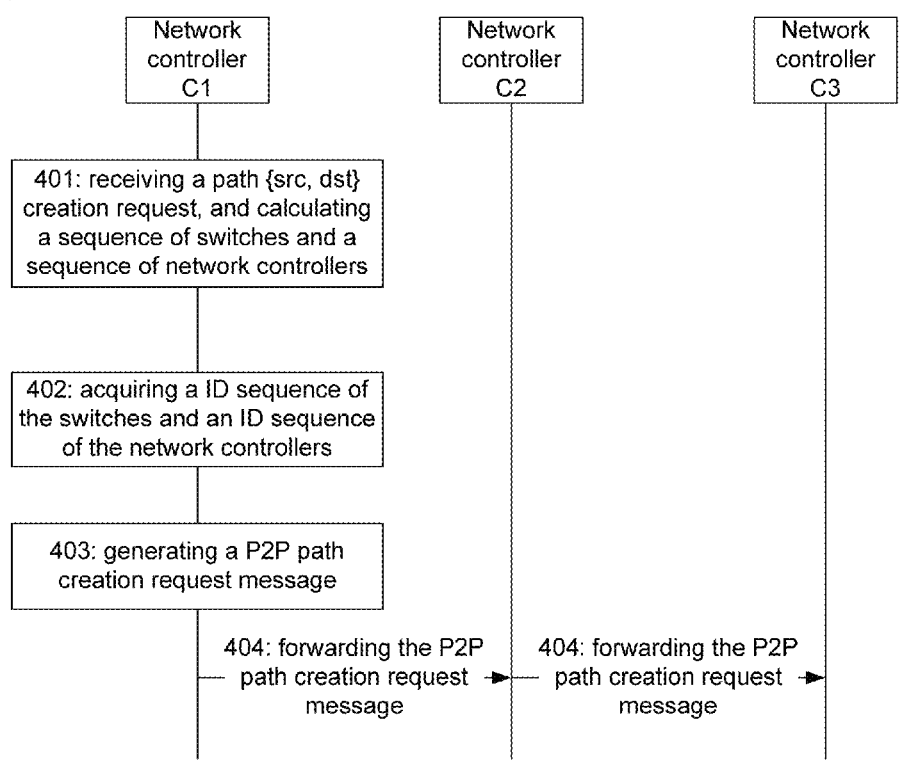
FIG. 4 is a flow of path calculation and forwarding of a network controller according to an embodiment of the disclosure.

FIG. 4 is a flow of path calculation and forwarding of a network controller according to an embodiment of the disclosure. A path calculation node C1 calculates a routing path according to network topology information and host location information, acquires the ID of each switch and the ID of each network controller on the path to generate a P2P path creation request message for routing path forwarding according to a distributed algorithm. Specific steps are described as follows:

Step 401: the network controller C1 receives a path {src, dst} creation request, and calculates a sequence of switches and a sequence of network controllers on a path {src, dst}, wherein the sequence of the switches is supposed to be {S1, S2, S3, S4, S6, S7, S9}, and the sequence of the network controllers is supposed to be {C1, C2, C3}.

Step 402: the network controller C1 acquires a ID sequence {H(S1), H(S1), . . . , H(S9)} of the switches on the path {src, dst} according to the distributed algorithm, and acquires an ID sequence of the network controllers {Ct1_ID1, Ct1_ID2, Ct1_ID3} on the path {src, dst}.

Step 403: the network controller C1 generates a P2P path creation request message, wherein a routing path header of the message is {Ct1_I1, Ct1_ID2}; a destination node of the message is Ct1_ID3; a message body of the message is a forwarding flow table {S1:FlowEntry list, S2:FlowEntry list, . . . , S9:FlowEntry list} transmitted to each switch on the path {src, dst}.

Step 404: the network controller C1 forwards the P2P path creation request message to a network controller C2 according to the routing path header {Ct1_ID1,Ct1_ID2}; and the network controller C2 forwards the P2P path creation request message to a network controller C3 according to the destination node of the message.

An implementation manner for Step 203 is as follows: the network controllers receiving the P2P path creation request messages on the paths preferably transmit the forwarding flow tables contained in the P2P path creation request messages to the switches managed by themselves to finish local path creation; then the network controllers determine whether themselves are the end-node network controllers or not according to the destination nodes of the P2P path creation request messages, and if NO, forward the P2P path creation request messages to the next network controllers according to the routing path headers; and if YES, the end-node network controllers return the P2P path creation response messages to the previous network controllers along the reverse paths.

Figure 5:
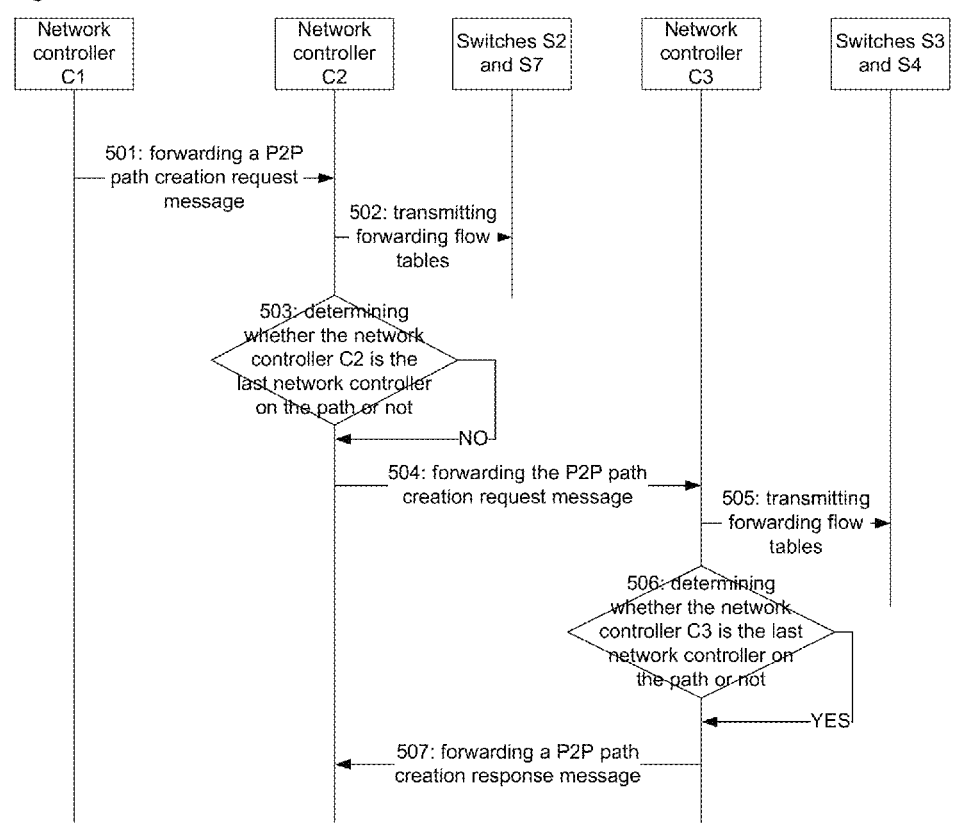
FIG. 5 is a flowchart of processing a P2P path creation request message by a network controller according to an embodiment of the disclosure.

To be connected with the embodiment shown in FIG. 4, FIG. 5 is a flowchart of processing a P2P path creation request message by a network controller according to an embodiment of the disclosure. The network controller transmits the forwarding flow tables for which it is responsible after receiving the P2P path creation request message, and continues forwarding the P2P path creation request message to the next node. Specific steps are described as follows:

Step 501: the network controller C2 receives the P2P path creation request message forwarded by the network controller C1.

Step 502: the network controller C2 transmits the corresponding forwarding flow tables to the switches for which it is responsible to finish local path creation, for example, the network controller C2 forwards the forwarding flow table S2:FlowEntry list to the switch S2 and forwards the forwarding flow table S7:FlowEntry list to the switch S7.

Step 503: the network controller C2 determines whether it is the end-node network controller on the path {src, dst} or not according to the destination node of the P2P path creation request message after finishing local path creation.

Step 504: since the network controller C2 is not the end-node network controller on the path {src, dst}, the network controller C2 forwards the P2P path creation request message to the network controller C3 according to the destination node.

Step 505: the network controller C3 transmits the corresponding forwarding flow tables to the switches for which it is responsible to finish local path creation, for example, the network controller C3 transmits the forwarding flow table S3:FlowEntry list to the switch S3 and forwards the forwarding flow table S4:FlowEntry list to the switch S4.

Step 506: the network controller C3 determines whether it is the end-node network controller on the path {src, dst} or not according to the destination node of the P2P path creation request message after finishing local path creation.

Step 507: since the network controller C3 is the end-node network controller on the path {src, dst}, the network controller C3 returns a P2P path creation response message to the previous node, i.e. the network controller C2.

Furthermore, in the implementation manner for Step 203: the end-node network controllers on the paths return successful P2P path creation response messages to the previous network controllers if local path creation succeeds after finishing local path creation, and return failed P2P path creation response messages to the previous network controllers if local path creation fails.

For the implementation of Step 204: when receiving the P2P path creation response messages, the intermediate-node network controllers on the paths forward the updated successful P2P path creation response messages along the reverse paths according to the local path creation results if local path creation succeeds and the successful P2P path creation response messages are received, forward the updated failed P2P path creation response messages along the reverse paths if local path creation succeeds and the failed P2P path creation response messages are received, and forward the updated failed P2P path creation response messages if local path creation fails and the failed or successful P2P path creation response messages are received.

The head-node network controllers determine that path creation succeeds when the successful P2P path creation response messages are received and local path creation succeeds, and determine that path creation fails and perform path recalculation when the failed P2P path creation response messages are received or local path creation fails.

Figure 6:
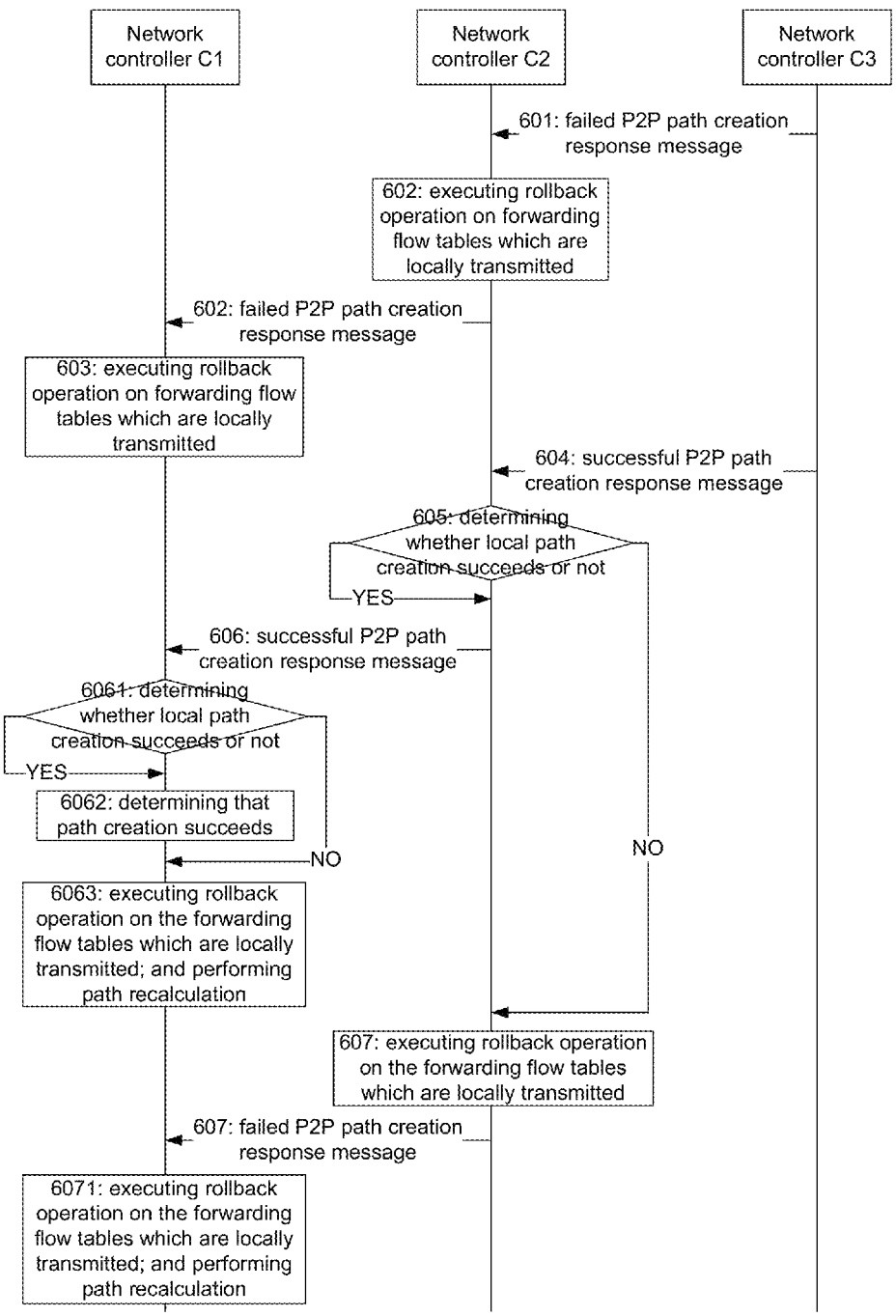
FIG. 6 is a flowchart of processing a P2P path creation request message by a network controller according to an embodiment of the disclosure.

To be connected with the embodiments shown in FIG. 4 and FIG. 5, FIG. 6 is a flowchart of processing a P2P path creation request message by a network controller according to an embodiment of the disclosure. Specific steps are described as follows:

Step 601: the network controller C2 receives the failed P2P path creation response message transmitted by the end-node network controller C3 on the path {src, dst}.

Step 602: since the path creation repose message received by the network controller C2 is the failed P2P path creation response message and the network controller C2 is not the node generating the P2P path creation request message, the network controller C2 returns the failed P2P path creation response message to the network controller C1 no matter whether the path creation of the network controller C2 succeeds or not, and meanwhile, the network controller C2 performs rollback operation on the forwarding flow tables which have been locally transmitted.

Step 603: the network controller C1 receives the failed P2P path creation response message, and because the network controller C1 is the node generating the P2P path creation request, the network controller C1 determines that path creation fails, and is required to perform path recalculation, and meanwhile, the network controller C1 performs rollback operation on the forwarding flow tables which have been locally transmitted.

Step 604: the network controller C2 receives the successful P2P path creation response message transmitted by the end-node network controller C3 on the path {src, dst}.

Step 605: the network controller C2 which is not the node generating the P2P path creation request determines whether local path creation succeeds or not, executes Step 606 if local path creation succeeds, and executes Step 607 if local path creation fails.

Step 606: the network controller C2 returns the successful P2P path creation response message to the previous network controller C1, and a subsequent flow includes:

Step 6061: the network controller C1 which is the node generating the P2P path creation request message determines whether local path creation succeeds or not when receiving the successful P2P path creation response message, and if local path creation succeeds, executes Step 6062 of determining that path creation succeeds; and if local path creation fails, the network controller C1 executes Step 6063 of determining that path creation fails, performing path recalculation and simultaneously performing rollback operation on the forwarding flow tables which have been locally transmitted.

Step 607: the network controller C2 returns the failed P2P path creation response message to the previous network controller C1, and meanwhile, performs rollback operation on the forwarding flow tables which have been locally transmitted, and a subsequent flow includes:

Step 6071: since the network controller C1 is the node, i.e. the head node, generating the P2P path creation request message, the network controller determines that path creation fails no matter whether local path creation succeeds or not when receiving the failed P2P path creation response message, is require to perform path recalculation, and meanwhile, performs rollback operation on the forwarding flow tables which have been locally transmitted.

In order to implement the method, each part shown in FIG. 1 executes operation as follows:

the switches are configured to establish the routing control channels with the specified network controllers in the distributed P2P network;

the network controllers are configured to, when receiving the path creation requests, perform path calculation as the head-node network controllers, generate the P2P path creation request messages, and forward the P2P path creation request messages along the paths; when receiving the P2P path creation request messages, transmit the forwarding flow tables contained in the P2P path creation request messages to the switches managed by themselves to finish local path creation; forward the P2P path creation request messages along the paths as the intermediate-node network controllers on the paths after finishing local path creation; return the P2P path creation response messages along the reverse paths as the end-node network controllers on the paths after finishing local path creation; when receiving the P2P path creation response messages, update the P2P path creation response messages in combination with local path creation results as the intermediate-node network controllers on the paths, and forward the updated P2P path creation response messages along the reverse paths; and determine whether the paths are successfully created or not in combination with the local path creation results as the head-node network controllers after receiving the P2P path creation response messages.

The boot server is configured to return the specified network controller list to the switches; or, boot the switches to any network controllers; and correspondingly, the switches are further configured to establish the routing control channels with the network controllers in the specified network controller list directly returned by the boot server; or, be reoriented to the specified network controllers according to the information returned by the any network controllers, and establish the routing control channels with the specified network controllers.

The network controllers are further configured to, after generating the P2P path creation request messages as the head-node network controllers, transmit the forwarding flow tables contained in the P2P path creation request messages to the switches managed by themselves.

The network controllers are further configured to, as the end-node network controllers, return the successful P2P path creation response messages along the reverse paths if local path creation succeeds; and return the failed P2P path creation response messages along the reverse paths if local path creation fails.

The network controllers are further configured to, when receiving the P2P path creation response messages as the intermediate-node network controllers, forward the updated successful P2P path creation response messages along the reverse paths if local path creation succeeds and the successful P2P path creation response messages are received; forward the updated failed P2P path creation response messages along the reverse paths if local path creation succeeds and the failed P2P path creation response messages are received; and forward the updated failed P2P path creation response messages along the reverse paths if local path creation fails and the failed or successful P2P path creation response messages are received.

The network controllers are further configured to, after receiving the P2P path creation response messages as the head-node network controllers, determine that path creation succeeds when the successful P2P path creation response messages are received and local path creation succeeds; and determine that path creation fails, and perform path recalculation when the failed P2P path creation response messages are received or local path creation fails.

The network controllers are further configured to, after receiving the P2P path creation response messages, perform rollback operation on the forwarding flow tables which have been locally transmitted if the failed P2P path creation response messages are received or local path creation fails.

Figure 7:
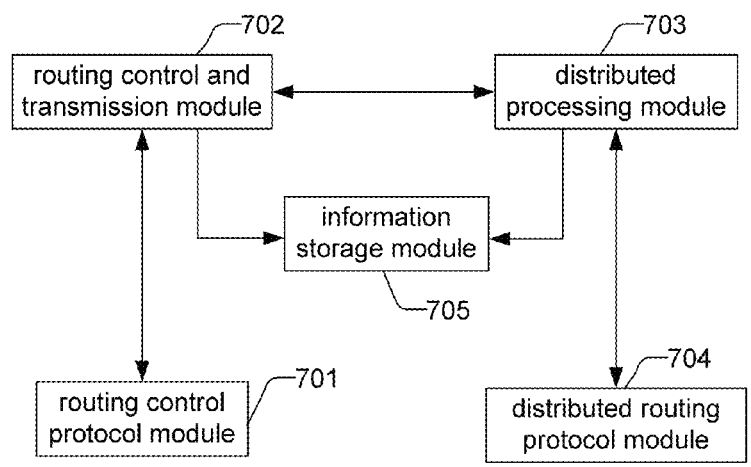
FIG. 7 is a structure diagram of a network controller according to an embodiment of the disclosure.

Specifically, the structure of the network controller in the embodiment of the disclosure is shown in FIG. 7, and main function modules include a first routing control protocol module 701, a routing control and transmission module 702, a distributed processing module 703, a distributed routing protocol module 704 and an information storage module 705, wherein the first routing control protocol module 701 is mainly responsible for establishment and maintenance of a routing control channel between the network controller and a switch and information transmission between the network controller and the switch. For example: when a routing control channel establishment request of the switch is processed, if a corresponding relationship between an ID of the switch and an ID of the network controller is inconsistent with a distributed algorithm, the routing control and transmission module 702 queries a network controller list for management over the switch to the distributed processing module 703, and returns the network controller list to the switch by virtue of a reorientation response. Information interaction between the network controller and the switch includes: communication security verification, switch information reporting, switch basic function configuration, switch data message reporting, transmission and management of a flow table of the switch and the like.

The routing control and transmission module 702 is responsible for the execution of operation such as path calculation and transmission and rollback of the forwarding flow table. For a network topology variation event or user data forwarding request, the routing control and transmission module 702 performs path calculation according to network topology and/or host location information in the information storage module 705, and interacts with the distributed processing module 703 to generate a P2P path creation request message. For the P2P path creation request message from the distributed processing module 703, the routing control and transmission module 702 transmits a related forwarding flow table to the switch for which the network controller is responsible through the first routing control protocol module 701. For a P2P path creation response message from the distributed processing module 703, if the P2P path creation response message is a failed P2P path creation response message, the routing control and transmission module 702 deletes the transmitted forwarding flow table, namely performs rollback operation, to the switch for which the network controller is responsible through the first routing control protocol module 701. Specifically: the routing control and transmission module 702 performs path calculation to obtain path information when the network controller receives the path creation request as a head-node network controller, and provides the path information for the distributed processing module 703; and the routing control and transmission module 702 is further configured to transmit the forwarding flow table provided by the distributed processing module 703 for the corresponding switch to finish local path creation through the first routing control protocol module 701, and provide a local path creation result for the distributed processing module 703.

The distributed processing module 703 is responsible for service processing of a distributed P2P network, such as processing of the P2P path creation request message. The distributed processing module 703 generates the P2P path creation request message according to the path information provided by the routing control and transmission module 702 during path creation, provides the forwarding flow table to the routing control and transmission module 702 to transmit when processing the P2P path creation request message, and notifies the routing control and transmission module 702 to execute rollback operation on the transmitted forwarding flow table if the P2P path creation response message is a failed P2P path creation response message processing the P2P path creation response message. Specifically, the distributed processing module 703 generates the P2P path creation message request according to the path information provided by the routing control and transmission module 702, and provides the P2P path creation request message for the distributed routing protocol module 704 to forward; the distributed processing module 703 is further configured to generate the P2P path creation response message according to the local path creation result provided by the routing control and transmission module 702, and provide the P2P path creation response message for the distributed routing protocol module 704 to forward; receive the P2P path creation request message provided by the distributed routing protocol module 704, and provide the forwarding flow table contained therein for the routing control and transmission module 703; receive the P2P path creation response message provided by the distributed routing protocol module 704, update the received P2P path creation response message according to the local path creation result provided by the routing control and transmission module 702, and provide the updated P2P path creation response message for the distributed routing protocol module 704 to forward; and determine whether a path is successfully created or not according to the local path creation result provided by the routing control and transmission module 702 and the P2P path creation response message provided by the distributed routing protocol module 704.

The distributed routing protocol module 704 is responsible for message interaction with other network controllers, including maintenance of a distributed routing table, routing of the P2P path creation request message and the P2P path creation response message, and the like.

The information storage module 705 is responsible for storage of related data on the network controller, mainly including storage of a state of the switch managed by the network controller and the corresponding forwarding flow table, host location data and global network topology data determined to be managed by the network controller according to the distributed algorithm, and the like.

During a practical application, the first routing control protocol module, the routing control and transmission module, the distributed processing module and the distributed routing protocol module may be implemented by a Central Processing Unit (CPU), Digital Signal Processor (DSP) or Field-Programmable Gate Array (FPGA) in the network controller; and the information storage module may be implemented by a memory in the network controller.

Figure 8:
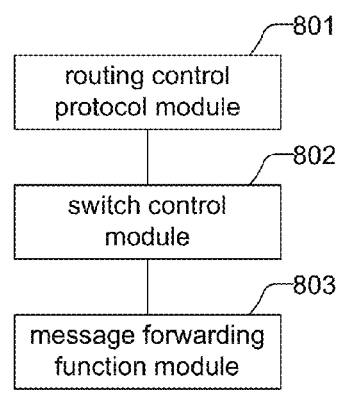
FIG. 8 is a structure diagram of a switch according to an embodiment of the disclosure.

Specifically, the structure of the switch in the embodiment of the disclosure is shown in FIG. 8, and main function modules include a second routing control protocol module 801, a switch control module 802 and a message forwarding function module 803, wherein the second routing control protocol module 801 is responsible for establishment and maintenance of a routing control channel between a network controller and the switch and information transmission between the network controller and the switch. When a routing control channel establishment request is sent to the network controller, for a reorientation response returned by the network controller, the routing control channel establishment request may be reinitiated to a new network controller. Information interaction between the network controller and the switch includes: communication security verification, switch information reporting, switch basic function configuration, switch data message reporting, transmission and management of a flow table of the switch and the like.

The switch control module 802 is responsible for reporting a related forwarding plane data message to the network controller through the second routing control protocol module 801, mapping a forwarding flow table transmitted by the network controller into a format required by hardware of the message forwarding function module 803, and transmitting the forwarding flow table to the message forwarding function module 803.

The message forwarding function module 803 is responsible for maintaining the forwarding flow table on the hardware, and performing matching processing and forwarding on the data message.

During a practical application, the second routing control protocol module, the switch control module and the message forwarding function module may be implemented by a CPU, DSP or FPGA in the switch.

The above is only the preferred embodiment of the disclosure and not intended to limit the scope of protection of the disclosure.

What is claimed is:

1. A Distributed Hash Table (DHT)-based control network implementation method, comprising:
   establishing, by switches, routing control channels with specified network controllers in a distributed Peer-to-Peer (P2P) network;
   performing, by one of the network controllers first receiving a path creation request as a head-node network controller, path calculation, generating P2P path creation request message, and forwarding the P2P path creation request message along a path;
   transmitting, by the network controllers receiving the P2P path creation request message on the path, forwarding flow tables contained in the P2P path creation request message to the switches managed by themselves to finish respective local path creation, wherein the network controllers receiving the P2P path creation request message include intermediate-node network controllers and an end-node network controller, wherein each of the intermediate-node network controllers on the path forwards the P2P path creation request message along the path after finishing local path creation, and the end-node network controller returns P2P path creation response message along reverse path after finishing local path creation;
   updating, by each of the intermediate-node network controllers receiving the P2P path creation response message, the P2P path creation response message in combination with a local path creation result, and forwarding the updated P2P path creation response message along the reverse path; and determining, by the head-node network controller, whether the path is successfully created or not in combination with a local path creation result after receiving the P2P path creation response message;

wherein a destination node of the P2P path creation request message is the end-node network controller on the path;

a routing path header of the P2P path creation request message consists of Identifiers (ID) of the other network controllers except the end-node network controller on the path; and a message body of the P2P path creation request message consists of the forwarding flow tables transmitted to each switch on the path.

2. The method according to claim 1, wherein the step of establishing, by the switches, the routing control channels with the specified network controllers in the distributed P2P network comprises:

selecting, by a boot server, network controllers responsible for managing the switches according to a distributed algorithm, and returning a network controller list including the selected network controllers to the switches; establishing, by the switches, the routing control channels with the selected network controllers; or, executing, by a boot server, a Domain Name Service (DNS) reorientation function and returning a network controller list to the switches; selecting, by the switches, any one of the network controllers from the network controller list and sending a routing control channel establishment request to any one of the network controllers;

receiving, by the switches from the any one of the network controllers, a network controller list including network controllers responsible for managing the switches; and establishing, by the switches, the routing control channels with the network controllers responsible for managing the switches in the network controller list.

3. The method according to claim 2, wherein the routing control channels are OpenFlow protocol channels, Simple Network Management Protocol (SNMP) channels or DIAMATER channels.

4. The method according to claim 1, wherein sequences of the network controllers on the path and sequences of the switches on the path are obtained by path calculation.

5. The method according to claim 4, wherein
the IDs of the other network controllers are arranged according to sequences of the other network controllers on the path; and
the forwarding flow tables transmitted to each switch are arranged according to the sequences of the switches on the path.

6. The method according to claim 1, after the head-node network controllers generates the P2P path creation request message, further comprising: transmitting, by the head-node network controller, the forwarding flow tables contained in the P2P path creation request message to the switches managed by themselves.

7. The method according to claim 6, wherein the step of returning, by the end-node network controller on the path, the P2P path creation response message along the reverse path after finishing local path creation is implemented as follows:

when local path creation succeeds, returning, by the end-node network controller, successful P2P path creation response message; and when local path creation fails, returning, by the end-node network controller, failed P2P path creation response message.

8. The method according to claim 7, wherein the step of updating, by each of the intermediate-node network controller receiving the P2P path creation response message, the P2P path creation response message in combination with the local path creation result, and forwarding the updated P2P path creation response message along the reverse path is implemented as follows:

when local path creation succeeds and the successful P2P path creation response message is received, forwarding the updated successful P2P path creation response message along the reverse path;

when local path creation succeeds and the failed P2P path creation response message is received, forwarding the updated failed P2P path creation response message along the reverse path; and when local path creation fails and the failed or successful P2P path creation response message is received, forwarding the updated failed P2P path creation response message along the reverse path.

9. The method according to claim 8, wherein the step of determining, by the head-node network controller, whether the path is successfully created or not in combination with the local path creation result after receiving the P2P path creation response message is implemented as follows:

when the head-node network controller receives the successful P2P path creation response message and local path creation succeeds, determining, by the head-node network controller, that path creation succeeds; and when the head-node network controller receives the failed P2P path creation response message or local path creation fails, determining, by the head-node network controller, that path creation fails, and performs path recalculation.

10. The method according to claim 9, after each of the network controllers on the path receives the P2P path creation response message, further comprising: when the failed P2P path creation response message is received or local path creation fails, performing, by each of the network controllers, rollback operation on the forwarding flow tables which have been locally transmitted.

11. A Distributed Hash Table (DHT)-based control network implementation system, comprising: switches and network controllers, wherein the switches are configured to establish routing control channels with specified network controllers in a distributed Peer-to-Peer (P2P) network;

the network controllers includes a head-node network controller first receiving a path creation request, and intermediate-node network controllers and an end-node network controller; wherein the head-node network controller is configured to perform path calculation, generate P2P path creation request message, and forward the P2P path creation request message along a path;

the intermediate-node network controllers and an end-node network controller are configured to, when receiving the P2P path creation request message, transmit forwarding flow tables contained in the P2P path creation request message to the switches managed by themselves to finish respective local path creation;

each of the intermediate-node network controllers is configured to forward the P2P path creation request message along the path after finishing local path creation;

the end-node network controller is configured to return

P2P path creation response message along reverse path after finishing local path creation; correspondingly, each of the intermediate-node network controllers is further configured to, when receiving the P2P path creation response message, update the P2P path creation response message in combination with a local path creation result, and forward the updated P2P path creation response message along the reverse path; and the head-node network controller is further configured to determine whether the path is successfully created or not in combination with a local path creation result after receiving the P2P path creation response message;

wherein a destination node of the P2P path creation request message is the end-node network controllers on the path;

a routing path header of the P2P path creation request message consists of Identifiers, ID of the other network controllers except the end-node network controller on the path; and a message body of the P2P path creation request message consists of the forwarding flow tables transmitted to each switch on the path.

12. The system according to claim 11, further comprising a boot server, the boot server is configured to select network controllers responsible for managing the switches according to a distributed algorithm, and return a network controller list including the selected network controllers to the switches; correspondingly, the switches are further configured to establish the routing control channels with the selected network controllers; or, the boot server is configured to execute a Domain Name Service (DNS) reorientation function and return a network controller list to the switches; correspondingly, the switches are further configured to select any one of the network controllers from the network controller list, send a routing control channel establishment request to any one of the network controllers, and receive a network controller list including network controllers responsible for managing the switches from any one of the network controllers, and then establish the routing control channels with the network controllers responsible for managing the switches in the network controller list.

13. The system according to claim 11, wherein

The head-node network controller is further configured to, after generating the P2P path creation request message, transmit the forwarding flow tables contained in the P2P path creation request messages to the switches managed by themselves.

14. The system according to claim 13, wherein the end-node network controller is further configured to return successful P2P path creation response message along the reverse path when local path creation succeeds; and return failed P2P path creation response message along the reverse path when local path creation fails.

15. The system according to claim 14, wherein each of the intermediate-node network controllers is further configured to, when receiving the P2P path creation response message, forward the updated successful P2P path creation response message along the reverse path when local path creation succeeds and the successful P2P path creation response message is received; forward the updated failed P2P path creation response message along the reverse path when local path creation succeeds and the failed P2P path creation response message is received; and forward the updated failed P2P path creation response message along the reverse path when local path creation fails and the failed or successful P2P path creation response message is received.

16. The system according to claim 15, wherein the header-node network controller is further configured to, after receiving the P2P path creation response message, determine that path creation succeeds when the successful P2P path creation response message is received and local path creation succeeds; and determine that path creation fails, and perform path recalculation when the failed P2P path creation response message is received or local path creation fails.

17. The system according to claim 16, wherein each of the network controllers is further configured to, after receiving the P2P path creation response message, perform rollback operation on the forwarding flow tables which have been locally transmitted if the failed P2P path creation response message is received or local path creation fails.

18. A network controller, comprising:

a memory for storing instructions; and a processor connected with the memory for implement a first routing control protocol module, a distributed processing module, a routing control and transmission module and a distributed routing protocol module, wherein the first routing control protocol module is configured to be responsible for establishment of a routing control channel between the network controller and a switch and information interaction between the network controller and the switch;

the distributed processing module is configured to generate a Peer-to-Peer (P2P) path creation request message according to path information provided by the routing control and transmission module, and provide the P2P path creation request message for the distributed routing protocol module to forward; generate a P2P path creation response message according to a local path creation result provided by the routing control and transmission module, and provide the P2P path creation response message for the distributed routing protocol module to forward; receive the P2P path creation request message provided by the distributed routing protocol module, and provide a forwarding flow table contained therein for the routing control and transmission module; receive the P2P path creation response message provided by the distributed routing protocol module, update the received P2P path creation response message according to the local path creation result provided by the routing control and transmission module, and provide the updated P2P path creation response message for the distributed routing protocol module to forward; and determine whether a path is successfully created or not according to the local path creation result provided by the routing control and transmission module and the P2P path creation response message provided by the distributed routing protocol module;

the routing control and transmission module is configured to perform path calculation to obtain the path information when the network controller receives the path creation request as a head-node network controller, and provide the path information for the distributed processing module; and transmit the forwarding flow table provided by the distributed processing module for the corresponding switch to finish local path creation through the first routing control protocol module, and provide the local path creation result for the distributed processing module; and the distributed routing protocol module is configured to forward or receive the P2P path creation request message along the path; forward or receive the P2P path creation response message along a reverse path; and provide the received P2P path creation request message or P2P path creation response message for the distributed processing module;

wherein a destination node of the P2P path creation request message is the end-node network controller on the path;

a routing path header of the P2P path creation request message consists of Identifiers, ID of the other network controllers except the end-node network controller on the path; and a message body of the P2P path creation request message consists of the forwarding flow tables transmitted to each switch on the path.

19. The network controller according to claim 18, wherein the distributed processing module is further configured to, when path creation is determined to fail, notify the routing control and transmission module to execute rollback operation on the forwarding flow table; and the routing control and transmission module is further configured to perform rollback operation on the transmitted forwarding flow table through the first routing control protocol module.

* * * * *